(12) United States Patent
Lee (10) Patent No.: US 9,588,621 B2
(45) Date of Patent: Mar. 7, 2017

(54) TOUCH SCREEN CONTROLLER AND METHOD FOR CONTROLLING THEREOF

(71) Applicant: HiDeep Inc., Gyeonggi-do (KR)

(72) Inventor: Hwan Hee Lee, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days.

(21) Appl. No.: 14/163,495

(22) Filed: Jan. 24, 2014

(65) Prior Publication Data

US 2014/0210780 A1    Jul. 31, 2014

(30) Foreign Application Priority Data

Jan. 25, 2013  (KR) .......... 10-2013-0008482

(51) Int. Cl.
G06F 3/044      (2006.01)
G06F 3/0354     (2013.01)

(52) U.S. Cl.
CPC .......... *G06F 3/044* (2013.01); *G06F 3/03545* (2013.01)

(58) Field of Classification Search
USPC ................................. 345/174, 173
See application file for complete search history.

(56) References Cited

U.S. PATENT DOCUMENTS

| 8,692,795 | B1 * | 4/2014 | Kremin ............... | G06F 3/044 |
| | | | | 345/173 |
| 2007/0129046 | A1 * | 6/2007 | Soh et al. ............ | 455/403 |
| 2011/0001708 | A1 * | 1/2011 | Sleeman .............. | 345/173 |
| 2012/0044151 | A1 * | 2/2012 | Wilson et al. ....... | 345/173 |

FOREIGN PATENT DOCUMENTS

| KR | 1020110057501 A | 1/2011 |
| KR | 1020120029210 A | 3/2012 |

OTHER PUBLICATIONS

Korean Office Action dated Mar. 24, 2014.

* cited by examiner

*Primary Examiner* — Lixi C Simpson
(74) *Attorney, Agent, or Firm* — Kane Kessler, P.C.; Barry E. Negrin (57) ABSTRACT

Disclosed are a touch screen controller and a method for controlling the same. The touch screen controller includes: a driving part which transmits a driving signal to a touch screen including a plurality of sensing cells; a touch signal sensing unit which transmits a sensing signal to the touch screen and transmits information on a capacitance change pattern of a predetermined area including at least two sensing cells among the plurality of the sensing cells by the driving signal and the sensing signal in correspondence with an object which has touched the touch screen; and a control unit which determines a kind of the object which touches the touch screen, by receiving the information on the capacitance change pattern from the touch signal sensing unit, sets a threshold in correspondence with the determined kind of the object, and determines that a touch signal is generated when a capacitance change amount greater than the set threshold is detected in one sensing cell or a group of sensing cells among the plurality of the sensing cells included in the touch screen.

24 Claims, 8 Drawing Sheets

|    | Y1 | Y2  | Y3 |    |
|----|----|-----|----|----|
| X1 | 3  | 10  | 3  |    |
| X2 | 10 | 100 | 10 |    |
| X3 | 3  | 10  | 3  |    |

Fig. 6b

|    | Y1 | Y2 | Y3 |    |
|----|----|----|----|----|
| X1 | 8  | 8  | 2  |    |
| X2 | 50 | 50 | 5  |    |
| X3 | 8  | 8  | 2  |    |

Fig. 7a

|     | Y1 | Y2  | Y3 |     |
|-----|----|-----|----|-----|
| X21 | 10 | 30  | 10 |     |
| X22 | 30 | 100 | 30 |     |
| X23 | 10 | 30  | 10 |     |

Fig. 7b

|     | Y1 | Y2 | Y3 |     |
|-----|----|----|----|-----|
| X21 | 25 | 25 | 8  |     |
| X22 | 50 | 50 | 10 |     |
| X23 | 25 | 25 | 8  |     |

| 10 | 5 | -7 | -20 | 4 |
|----|-----|-----|-----|----|
| 20 | 40 | 77 | 101 | 20 |
| 30 | 120 | 250 | 220 | 35 |
| 40 | 80 | 200 | 140 | 7 |
| 10 | -15 | 90 | 30 | 0 |

Fig. 10b

|   |     |     |     |   |
|---|-----|-----|-----|---|
|   | 40  | 77  | 101 |   |
|   | 120 | 250 | 220 |   |
| 40| 80  | 200 | 140 |   |
|   |     | 90  |     |   |

Fig. 11

TOUCH SCREEN CONTROLLER AND METHOD FOR CONTROLLING THEREOF

BACKGROUND

Field

The present invention relates to a touch screen controller and a method for controlling the same.

Description of Related Art

A touch screen is a device for inputting information by performing a touch operation thereafter, referred to as touch) on due characters or a particular location on the display screen through use of a user's finger, a stylus pen and the like without using an input device like a keyboard or a mouse. The touch screen is used in mobile electronic equipments like PDA, a mobile terminal, a variety of electric home appliances, an automatic teller machine, etc.

When multiple objects approach and/or touch the touch screen by means of the finger and stylus pen, the touch screen is able to simultaneously detect the multiple objects and to detect the shapes of the objects in more detail. However, it is necessary to measure, identify and distinguish between many kinds of the objects capable of approaching or touching the touch screen at the same time. However, devices equipped with a conventional touch screen (including their support software and/or circuits) cannot stably measure the objects. Also, in a device equipped with a single touch screen, the user may be enabled to switch a finger mode or a stylus mode by adding a separate input-mode conversion button or conversion menu. However, when the separate input-mode conversion button is added, it may be very troublesome and complicated for the user to enter a desired menu and change the input mode every time. Besides, the device has a larger volume.

SUMMARY

One aspect of the present invention is a touch screen controller that includes: a driving part which transmits a driving signal to a touch screen including a plurality of sensing cells; a touch signal sensing unit which transmits a sensing signal to the touch screen and transmits information on a capacitance change pattern of a predetermined area including at least two sensing cells among the plurality of the sensing cells by the driving signal and the sensing signal in correspondence with an object which has touched the touch screen; and a control unit which determines a kind of the object which touches the touch screen, by receiving the information on the capacitance change pattern from the touch signal sensing unit, sets a threshold in correspondence with the determined kind of the object, and determines that a touch signal is generated when a capacitance change amount greater than the set threshold is detected in one sensing cell or a group of sensing cells among the plurality of the sensing cells included in the touch screen.

Additionally, the information on the capacitance change pattern includes at least one of a sum of the capacitance change amounts of the sensing coils included in the predetermined area, the number of the sensing cells with the capacitance change amount greater than a predetermined capacitance change amount among the sensing cells included in the predetermined area, the number of the sensing cells of which the capacitance change amounts are greater than a predetermined rate of a maximum capacitance change amount or a minimum capacitance change amount among the sensing cells included in the predetermined area, and a ratio of a sum of a predetermined number of upper capacitance change amounts within the touch area to a sum of the predetermined number of lower capacitance change amounts within the touch area.

Additionally, the threshold is classified into a group threshold and a comparison threshold. The sensing cells of which the capacitance change amounts greater than the group threshold are detected among the plurality of the sensing cells are set as the group by the control unit. The control unit calculates a sum of the capacitance change amounts of the sensing cells set as the group, and compares the sum with the comparison threshold. When the sum of the capacitance chance amounts is greater than the comparison threshold, the control unit determines that the touch has been input.

Additionally, the comparison threshold is classified into a first threshold corresponding to a finger, or a second threshold corresponding to a stylus pen.

Additionally, the control unit is further connected to a memory unit storing information on the threshold according to the kind of the object, and receives the information on the threshold from the memory unit.

Additionally, the control unit given an index in correspondence with the touch signal, and detects and distinguishes multiple simultaneous touches on the touch screen in accordance with the index.

Another aspect of the present invention is a touch screen controller that includes: a driving part which transmits a driving signal to a touch screen including a plurality of sensing cells; a touch signal sensing unit which transmits a sensing signal to the touch screen and transmits information on a capacitance change pattern of the sensing cells in a predetermined area among the plurality of the sensing cells by the driving signal and the sensing signal in correspondence with an object which has touched the touch screen; and a control unit performing a touch processing mode including at least a first touch processing mode and a second touch processing mode which is performed in correspondence with mutually different thresholds. When the first touch processing mode is performed, the control unit prevents the second touch processing mode from being performed.

Additionally, the information on the capacitance change pattern includes at least one of a sum of a capacitance change amount of the plurality of the sensing cells within a touch area having a predetermined area in the touch screen, the number of the sensing cells with the capacitance change amount greater than a predetermined capacitance change amount within the touch area, the number of the sensing cells of which the capacitance change amounts are greater than a predetermined rate of a maximum capacitance change amount or a minimum capacitance change amount within the touch area, and a ratio of a sum of a predetermined number of upper capacitance change amounts within the touch area to a sum of a predetermined number of lower capacitance change amounts within the touch area.

Additionally, the control unit is further connected to a memory unit storing a threshold of the capacitance change amount corresponding to the object, and sets the threshold stored in the memory unit in correspondence with the capacitance change pattern.

Additionally, the threshold is classified into a group threshold and a comparison threshold. The control unit receives the sensing signal. The sensing cells of which capacitance change amounts greater than the group threshold are detected among the plurality of the sensing cells are set as a group by the control unit. The control unit calculates a sum of the capacitance change amounts of the sensing cells set as the group, and compares the sum with the comparison threshold. When the sum of the capacitance change amounts is greater than the comparison threshold, the control unit determines that a touch has been input. The control unit generates the information on the capacitance change pattern by using information on the capacitance change amounts of the sensing cells determined to which the touch has been input.

Additionally, the comparison threshold corresponds to a finger or a stylus pen.

Additionally, the control unit gives an index in correspondence with the touch signal, and detects and distinguishes multiple simultaneous touches on the touch screen in accordance with the index.

Further another aspect of the present invention is a method for controlling a touch screen which detects a touch in correspondence with a capacitance change amount of a plurality of sensing cells. The method includes: identifying a kind of an object by means of information on a capacitance change pattern of a predetermined area including at least two sensing cells among the plurality of the sensing cells by the object touching the touch screen; and setting a threshold corresponding to the kind of the object and performing a touch processing mode by determining that the touch has been input when a capacitance change amount greater than the threshold is detected.

Additionally, the information on the capacitance change pattern includes at least one of a sum of the capacitance change amounts of the plurality of the sensing cells within a touch area having a predetermined area in the touch screen, the number of the sensing cells with the capacitance change amount greater than a predetermined capacitance change amount within the touch area, the number of the sensing cells of which the capacitance change amounts are greater than a predetermined rate of a maximum capacitance change amount or a minimum capacitance change amount within the touch area, and a ratio of a sum of a predetermined number of upper capacitance change amounts within the touch area to a sum of a predetermined number of lower capacitance change amounts within the touch area.

Additionally, the performing the touch processing mode further includes: giving the same index to the same touch signals determined to be generated by the same object; and detecting and distinguishing multiple simultaneous touches on the touch screen in accordance with the index.

Additionally, the threshold is classified into a group threshold and a comparison threshold. The method further includes scanning prior to identifying the object. In the scanning step, the sensing cells of which capacitance change amounts greater than the set group threshold are detected among the plurality of the sensing cells are set as a group. Whether the touch is input or not is determined by calculating a sum of the capacitance change amounts of the sensing cells set as the group and by comparing the sum with the comparison threshold.

Yet another aspect of the present invention is a method for controlling a touch screen which detects a touch in correspondence with a capacitance change amount of a plurality of sensing cells. The method includes: identifying a kind of an object by means of information on a capacitance change pattern of a predetermined area including at least two sensing cells among the plurality of the sensing cells formed by the object touching the touch screen; and performing a touch processing mode including at least a first touch processing mode and a second touch processing mode in accordance with the mode in correspondence with the kind of the object. The performing in accordance with the mode includes preventing the second touch processing mode from being performed when the first touch processing mode is performed in correspondence with the touching object.

Additionally, the identifying the kind of the object further includes determining the kind of the object by using the information on the capacitance change pattern.

Additionally, the performing in accordance with the mode further includes respectively giving the same index to touch signals determined to be generated by the same object; and detecting and distinguishing multiple simultaneous touches on the touch screen in accordance with the index.

Additionally, the information on the capacitance change pattern includes at least one of a sum of a capacitance change amount of the plurality of the sensing cells within a touch area having a predetermined area in the touch screen, the number of the sensing cells with the capacitance change amount greater than a predetermined capacitance change amount within the touch area, the number of the sensing cells of which the capacitance change amounts are greater than a predetermined rate of a maximum capacitance change amount or a minimum capacitance change amount within the touch area, and a ratio of a sum of a predetermined number of upper capacitance change amounts within the touch area to a sum of a predetermined number of lower capacitance change amounts within the touch area.

Additionally, the threshold is classified into a group threshold and a comparison threshold. The method further includes scanning prior to identifying the object. In the scanning step, the sensing cells of which capacitance change amount greater than the set group threshold are detected among the plurality of the sensing cells are set as a group. Whether the touch is input or not is determined by calculating a sum of the capacitance change amounts of the sensing cells set as the group and by comparing the sum with the comparison threshold.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, an embodiment of the present invention will be described in detail with reference to the accompanying drawings.

Figure 1:
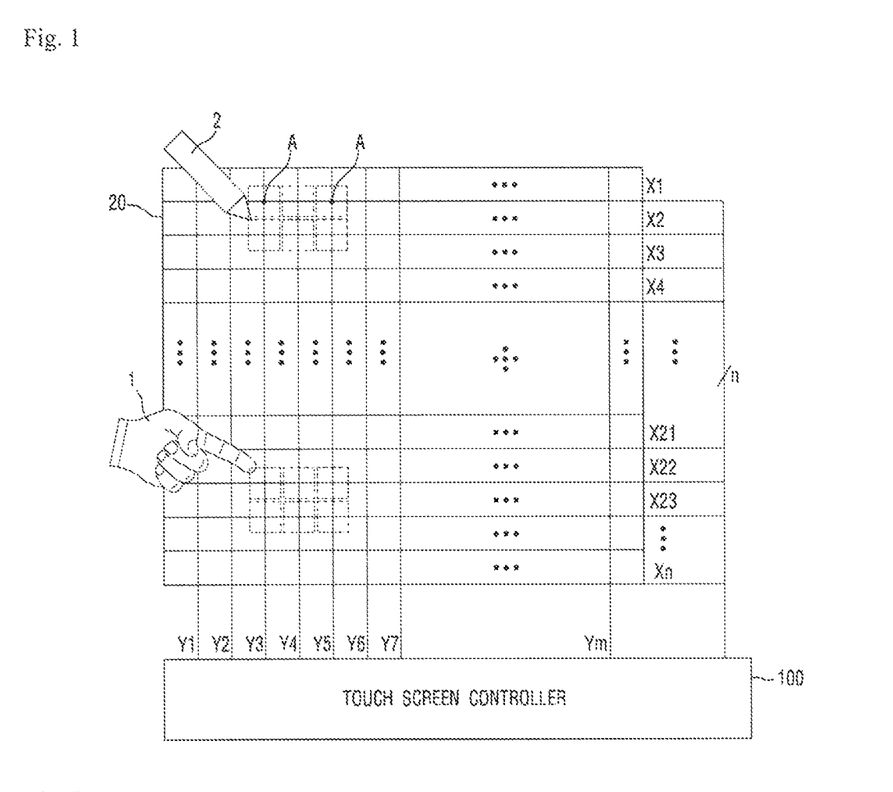
FIG. 1 is a block diagram showing a touch screen controller and a touch screen that is controlled by the touch screen controller in accordance with an embodiment or the present invention.

FIG. 1 is a block diagram showing a touch screen controller and a touch screen that is controlled by the touch screen controller in accordance with an embodiment of the present invention.

As shown in FIG. 1, a touch screen controller 100 according to the embodiment of the present invention may be connected to a touch screen 20 and perform two or more touch processing modes in correspondence with an object that has touched the touch screen 20. Here, the object may include at least a first object 1 and/or a second object 2 different from the first object 1. Also, the first object 1 may mean a human finger (hereafter, referred to as a finger), and the second object 2 may mean a stylus pen. The stylus pen touches the touch screen 20, and then the touch screen 20 detects an input of the second object.

The touch screen 20 includes a plurality of drive lines X1, X2, X3, . . . , Xn−1, and Xn arranged in a first direction, a plurality of sensing lines Y1, Y2, Y3, . . . , Ym−1, and Ym arranged to cross the drive lines, and a plurality of sensing cells "A" formed at the crossings of the drive lines X1, X2, X3, . . . , Xn−1, and Xn and the sensing line Y1, Y2, Y3, . . . , Ym−1, and Ym.

The plurality of the drive lines X1, X2, X3, . . . , Xn−1, and Xn and the plurality of the sensing lines Y1, Y2, Y3, . . . , Ym−1, and Ym are formed in different layers on a transparent substrate (not shown). It is preferable that the drive lines and the sensing lines are made of a transparent conductive material. Here, the transparent conductive material may be formed of indium-tin-oxide (ITO), indium-zinc-oxide (IZO) or carbon nano tube (CNT). Also, an insulation layer (not shown) functioning as a dielectric material is formed between the plurality of the drive lines X1, X2, X3, . . . , Xn−1, and Xn and the plurality of the sensing lines Y1, Y2, Y3, . . . , Ym−1, and Ym.

The touch screen 20 may be represented by mutual capacitance circuits formed between the plurality of the drive lines X1, X2, X3, . . . , Xn−1, and Xn and the plurality of the sensing lines Y1, Y2, Y3, . . . , Ym−1, and Ym. Each of the mutual capacitances forms a plurality of sensing cells "A". Also, the drive lines X1, X2, X3, . . . , Xn−1, and Xn and the sensing lines Y1, Y2, Y3, . . . , Ym−1, and Ym may include a predetermined parasitic capacitance respectively.

Although the embodiment shown in FIG. 1 takes an example in which the drive lines X1, X2, X3, . . . , Xn−1, and Xn and the sensing lines Y1, Y2, Y3, . . . , Ym−1, and Ym are arranged to orthogonally cross each other, this is just an embodiment. They may be also arranged to cross in the form of other geometrical structures (a concentric line and a radial line of a polar coordinate arrangement), etc.

As described above, when there is no conductive object (finger or stylus pen) approaching the crossings of the drive lines X1, X2, X3, . . . , Xn−1, and Xn and the sensing line Y1, Y2, Y3, . . . , Ym−1, and Ym, that is, the sensing cells "A", a mutual capacitance (MC) generated at the sensing cell "A" does not change. However, when the conductive object approaches or touches the sensing cell "A", the mutual capacitance (MC) does change. The change causes a change of the current and/or voltage transmitted to the sensing line connected to the sensing cell "A".

The touch screen controller 100 detects the change of the current and/or voltage caused by the magnitude change of the mutual capacitance (MC) generated in the plurality of the sensing cells "A" formed in the touch screen 20, thereby determining through the touch processing mode that a touch signal is generated.

For the purpose of performing the touch processing mode, the touch screen controller 100 analyzes the change of the capacitance generated in the touch screen 20, distinguishes the touch signal from noise, analyses the touch signal, and then identifies whether the object touched on the touch screen 20 is the first object 1 or the second object 2. Then, the touch screen controller 100 performs the touch processing mode corresponding to the identified object. In other words, the touch screen controller 100 analyzes the touch signal generated by the touch of the first object 1 to the touch screen 20, and then performs a first touch processing mode, and analyzes the touch signal generated by the touch of the second object 2 to the touch screen 20, and then performs a second touch processing mode, thereby allowing the first touch processing mode and the second touch processing mode to be performed in correspondence with the object. Here, the first touch processing mode is used for processing the touch generated by the finger, and the second touch processing mode is used for processing the touch generated by the stylus pen.

Also, the touch screen controller 100 gives an index to the touch signal, thereby detecting and distinguishing multiple simultaneous touches on the touch screen 20.

Figure 2:
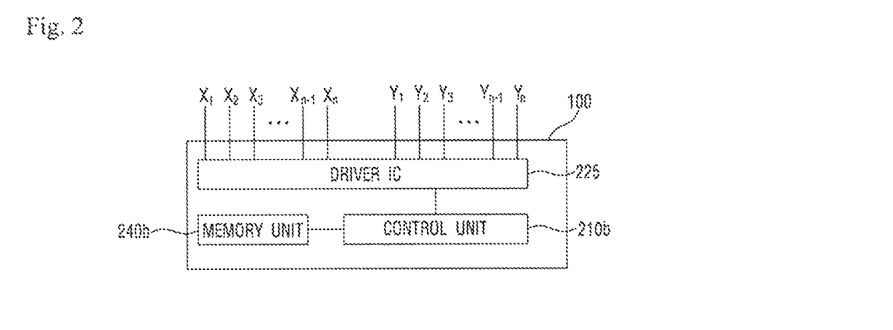
FIG. 2 is a block diagram showing a first embodiment of the touch screen controller shown in FIG. 1.

FIG. 2 is a block diagram showing a first embodiment of the touch screen controller shown in FIG. 1. Referring to FIG. 2, the touch screen controller 100 may include a driving part 220a, a touch signal sensing unit 230a, and a control unit 210a. The driving part 220a transmits a driving signal to the touch screen including the plurality of the sensing cells "A". The touch signal sensing unit 230a transmits a sensing signal to the touch screen 20 and transmits information on a pattern of the capacitance change amount of a predetermined area including at least two sensing cells "A" among the plurality of the sensing cells by the driving signal and the sensing signal in correspondence with the object which has touched the touch screen 20. The control unit 210*a* determines the kind of the object which touches the touch screen 20, by receiving the information on the capacitance change pattern from the touch signal sensing unit 230*a*, sets a threshold in correspondence with the determined kind of the object, and determines that the touch signal is generated if the capacitance change amount greater than the set threshold is detected in one sensing cell among the plurality of the sensing cells included in the touch screen or is detected in the sensing cell included in a group.

The driving part 220*a* may sequentially apply a driving signal to the plurality of the drive lines X1, X2, X3, . . . , Xn−1, and Xn by the control of the control unit 210*a*. The driving part 220*a* sequentially provides the driving signal to the each of the drive lines X1, X2, X3, . . . , Xn−1, and Xn. Accordingly, when the touch screen controller 100 provides the driving signal to any one of the drive lines X1, X2, X3, . . . , Xn−1, and Xn, the other drive lines other than the drive line provided with the driving signal may remain grounded.

The touch signal sensing unit 230*a* transmits the sensing signal to the sensing lines Y1, Y2, Y3 . . . Ym−1, Ym by the control of the control unit 210*a*, and receives the capacitance change detected by the respective sensing cells "A" by the sensing signal, and then may transmit the result to the control unit 210*a*.

The mutual capacitance is respectively generated at a plurality of crossings, i.e., the sensing cells "A" formed by the plurality of the sensing line Y1, Y2, Y3, . . . , Ym−1, and Ym crossing the driving signal-applied drive line. When an object like a person's finger, a stylus pen, etc., touches the sensing cells "A", the capacitance change occurs at the corresponding sensing cells "A". The capacitance change generated in the touch screen 20 may be caused by Hover where the object approaches the touch screen 20 without touching the touch screen 20, by touchdown of the object on the touch surface, by maintenance time or duration time of the touch, by drag motion of the object over the touch surface (or motion of the object while maintaining a predetermined distance from the touch surface without directly touching the touch surface), and by lift-off of the object from the touch surface. Also, it is important to identify whether the capacitance change is caused by the Hover or the touch in order that the touch screen controller 100 operates accurately.

In order to prevent the touch processing mode from being performed by the capacitance change amount caused due to the Hover, noise and the like, the control unit 210*a* compares the information on the capacitance change amount, which is transmitted from the touch screen 20, with a preset initial threshold. If the capacitance change amount is less than the initial threshold, the control unit 210*a* may determine that there has occurred the Hover, the noise and the like. If the capacitance change amount is greater than the initial threshold, the control unit 210*a* may determine that the touch signal has been generated. In more detail, the control unit 210*a* receives each of the capacitance change amounts from the touch signal sensing unit 230*a*. Then, if the magnitude of the change amount is greater than the initial threshold, the control unit 210*a* determines that the touch signal has been generated by the touch of a predetermined object on the touch screen 20. Also, the control unit 210*a* is able to identify the kind of the object which has touched the touch screen 20 by analyzing the capacitance change amount of each sensing cell "A" that is determined that the touch signal has been generated therein. The control unit 210*a* may recognize that the touch has occurred when the amount of the capacitance change generated in one sensing cell is greater than the threshold, and may recognize that the touch has occurred when the sum of the capacitance change amount included the all the sensing cells of the group including the plurality of the sensing cells is greater than the threshold.

In accordance with the result of determining that the object is the first object 1 or the second object 2, the control unit 210*a* may change the initial threshold into a first threshold and a second threshold. For convenience of description, it is assumed that the first threshold is greater than the second threshold. Also, it is possible that the initial threshold is equal to the second threshold. Each threshold may be compared with a result of the integration of the capacitance change amount with respect to a certain period of time. If the capacitance change amount is between the first threshold and the second threshold, the control unit 210*a* may recognize that the touch has been input by the second object 2. If the capacitance change amount is greater than the first threshold, the control unit 210*a* may recognize that the touch has been input by the first object 1. When the first object 1 is the finger and the second object 2 is the stylus pen, the finger has a touch area greater than that of the stylus pen. Accordingly, the capacitance change amount by the first object 1 may be greater than the capacitance change amount by the second object 2. Therefore, the first threshold caused by the first object 1 is set to be greater than the second threshold.

In the embodiment, the control unit 210*a* performs the touch processing mode including at least the first touch processing mode and the second touch processing mode which is performed in correspondence with the mutually different thresholds. When the first touch processing mode is performed, the control unit 210*a* can prevent the second touch processing mode from being performed. Here, the first touch processing mode may be performed by the touch of the first object 1, and the second touch processing mode may be performed by the touch of the second object 2. Also, the first touch processing mode may be performed when the capacitance change amount is greater than the first threshold, and the second touch processing mode may be performed when the capacitance change amount is greater than the second threshold and less than and not equal to the first threshold.

The control unit 210*a* may give the index to the touch signals. The index is used for distinguish whether the touch signals having different generation point of time and/or generation positions are the same as each other or distinct. The same index is given to the touch signals determined to be the same and different indices are given to the touch signals determined to be different. The index is given according to an index matching condition. Here, the index matching condition may be created by using a touch input time difference, a distance between the touches, or the like.

In the embodiment the touch screen controller 100 may further include a memory unit 240*a*. The memory unit 240*a* may store threshold information in correspondence with the object which touches the touch screen 20. Accordingly, the control unit 210*a* is able to grasp the first threshold or the second threshold to be set of the capacitance change amount by using the threshold information stored in the memory unit 240*a*. The control unit 210*a* may determine whether or not to react to the capacitance change generated by the object in correspondence with the grasped first threshold or the second threshold. The memory unit 240*a* further stores the index matching condition and the index, thereby allowing the control unit 210*a* to give the index to the touch signal in accordance with the index matching condition.

The memory unit 240*a* may be comprised of the program memory and data memories. Here, the program memory may store a program to drive the touch screen controller 100. The data memory may store the threshold information, the index matching condition, and the index.

Figure 3:
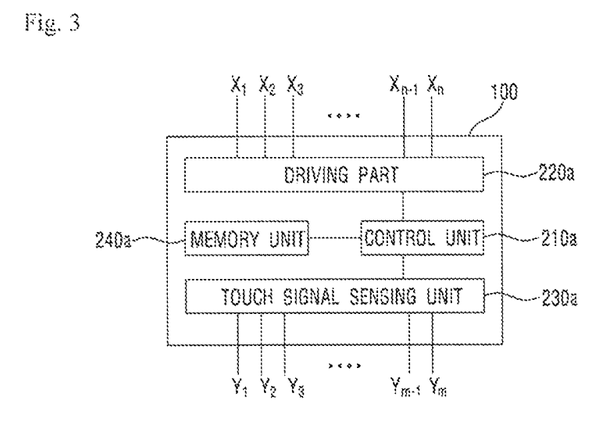
FIG. 3 is a block diagram showing a second embodiment of the touch screen controller shown in FIG. 1.

FIG. 3 is a block diagram showing a second embodiment of the touch screen controller shown in FIG. 1.

As shown in FIG. 3, the touch screen controller 100 may include a control unit 210*b*, a driver IC 225 and a memory unit 240*b*. The touch screen controller 100 is different from the touch screen controller of FIG. 2 in that the plurality of the drive lines X1, X2, X3, . . . , Xn−1, and Xn and the plurality of the sensing lines Y1, Y2, Y3, . . . , Ym−1, and Ym are connected to the driver IC 225. In other words, the driver IC 225 of the touch screen controller 100 shown in FIG. 3 is capable of performing both functions of the driving part 220*a* and the touch signal sensing unit 230*a* of FIG. 2.

Since the control unit 210*b* and the memory unit 240*b* perform the same functions as those of the control unit 210*a* and the memory unit 240*a* shown in FIG. 2, a detailed description thereof will be omitted.

Figure 4:
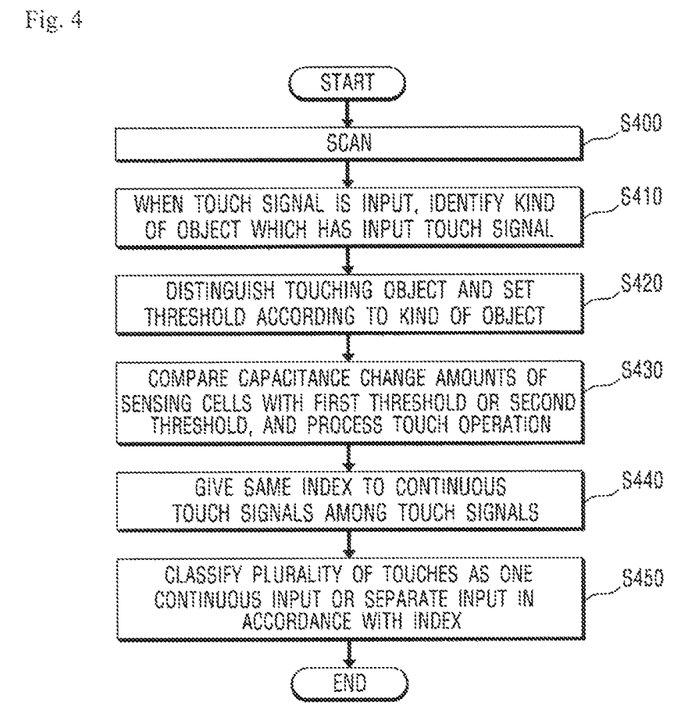
FIG. 4 is a flowchart showing a first embodiment of a method for controlling the touch screen of the touch screen controller according to the embodiment of the present invention.

FIG. 4 is a flowchart showing a first embodiment of a method for controlling the touch screen of the touch screen controller according to the embodiment of the present invention.

Referring to FIG. 4, the touch screen controller 100 controls the touch screen 20 which detects the touch in correspondence with the capacitance change amount of the plurality of the sensing cells "A", determines the kind of the object by the information on the capacitance change pattern generated by the object which has touched the touch screen 20, and determines that the touch has been input when the capacitance change amount greater than the set threshold is detected, and then performs the touch processing mode. For this purpose, the touch screen controller 100 scans whether the touch signal has been input to the touch screen 20 or not and detects the capacitance change amount of the each sensing cell "A" of the touch screen 20, thereby determining that the touch has been input.

Also, the touch screen controller 100 can perform the touch processing mode including at least the first touch processing mode and the second touch processing mode in correspondence with the object touching the touch screen 20. When the second object touches the touch screen 20 after the first touch processing mode is performed by the touch of the first object to the touch screen 20, the touch screen controller 100 can prevent the second touch processing mode from being performed.

The above will be described in more detail. The touch screen controller 100 determines whether the touch has occurred or not through scanning (S400). The scanning may be performed such that the driving part 220*a* or the driver IC 225 transmits the driving signal through the drive lines X1, X2, X3, . . . , Xn−1, and Xn, and the touch signal sensing unit 230*a* or the driver IC 225 transmits the sensing signal through the sensing lines Y1, Y2, Y3, . . . , Ym−1, and Ym, so that the change of the mutual capacitance (MC) formed between the drive line and the sensing line is detected. Through the scanning, the touch screen controller 100 is able to detect that the magnitude of the mutual capacitance formed in each of the sensing cells "A" Is changed by the touch.

When the touch occurs, the kind of the object which has touched the touch screen 20 is identified by analyzing the capacitance change pattern generated by the touch (S410).

Here, in order not to react to the capacitance change amount generated by the Hover, noise, or the like, the touch screen controller 100 may set an initial threshold. When the capacitance change amount is less than the initial threshold through the scanning, it can be determined that the capacitance change amount is caused not by the touch signal, but by the Hover, noise, or the like, and when the capacitance change amount is greater than the initial threshold, it can be determined that the capacitance change amount is caused by the touch signal. When the capacitance change amount is greater than the initial threshold, the touch screen controller 100 determines that the touch signal is generated, analyzes the capacitance change pattern of each of the sensing cells "A" of the touch screen 20, thereby identifying whether the object which has touched the touch screen 20 is the first object 1 or the second object 2. The capacitance change pattern of each of the sensing cells "A" of the touch screen 20 may have a particular rule in correspondence with the kind of the object. Then, the touch screen controller 100 stores the pattern analysis information in the memory units 240*a* and 240*b*, etc., and compares the capacitance change amount received from the touch signal sensing unit 230*a* or the driver IC 225 with the capacitance change pattern stored in the memory units 240*a* and 240*b*, thereby identifying the object which has touched the touch screen 20. The capacitance change pattern may include at least one of a sum of the capacitance change amount of each of the sensing cells "A" within the touch area, the number of the sensing cells "A" with the capacitance change amount greater than a predetermined capacitance change amount within the touch area, the number of the sensing cells "A" of which the capacitance change amount is greater than a predetermined rate of the maximum capacitance change amount or minimum capacitance change amount within the touch area, and a ratio of a sum of a predetermined number of the upper capacitance change amounts within the touch area to a sum of the predetermined number of the lower capacitance change amounts within the touch area, etc.

Then, the touch screen controller 100 analyses the capacitance change amount generated in the plurality of the sensing cells "A" and sets the threshold (S420). If the first object 1 touches the touch screen 20, the touch screen controller 100 sets the first threshold, and if the second object 2 touches the touch screen 20, the touch screen controller 100 sets the second threshold. Then the touch screen controller 100 compares the capacitance change amount of the sensing cells "A" with the set first threshold or the set second threshold, and processes the touch operation (S430). That is, when it is determined that the first object 1 has touched the touch screen 20, the first threshold is set. As a result of this, the touch screen controller 100 recognizes the touch signal generated only by the touch that caused the capacitance change amount greater than the first threshold, and when it is determined that the second object 2 has touched the touch screen 20, the second threshold is set. As a result of this, the touch screen controller 100 recognizes the touch signal generated only by the touch that caused the capacitance change amount greater than the second threshold. Here, if the touch is input by the second object 2 during processing the touch caused by the first object 1, the touch screen controller 100 is not able to recognize the touch as a valid touch because the capacitance change amount of the touch input by the second object 2 is less than the set first threshold, so that the touch input by the second object 2 cannot be processed. Therefore, the touch screen controller 100 is not able to process the touch caused by the second object 2 during processing the touch caused by the first object 1. However, if the touch is input by the first object 1 during processing the touch caused by the second object 2, the touch screen controller 100 is able to recognize the touch as a valid touch because the capacitance change amount of the touch input by the first object 1 is greater than the set second threshold. Accordingly, the touch screen controller 100 is able to automatically process the touch caused by the first object 1 during processing the touch caused by second object 2.

Also, in the embodiment, the touch screen controller 100 gives the index to each of the touch signals through the first touch processing mode and the second touch processing mode. Here, the touch screen controller 100 may give the same index to the touch signal that satisfies the same index matching condition among the continuous touch signals, and may classify the plurality of the touches input to the touch screen 20 as one continuous input or a separate input in accordance with the given index (S450). As a result, in an application which is executed in a device equipped with the touch screen controller 100, it is possible to separate and process the touches in accordance with the index information.

In the embodiment, although the processes S410 to S430 related to the threshold setting and the process S440 related to the index giving have been sequentially described, the sequential relationship between the processes may be reversed to that of the above-description. Therefore, the concept of the present invention is not directly hunted to the sequential relationship between the processes S410 to S430 related to the threshold setting and the process S440 related to the index giving.

Figure 5:
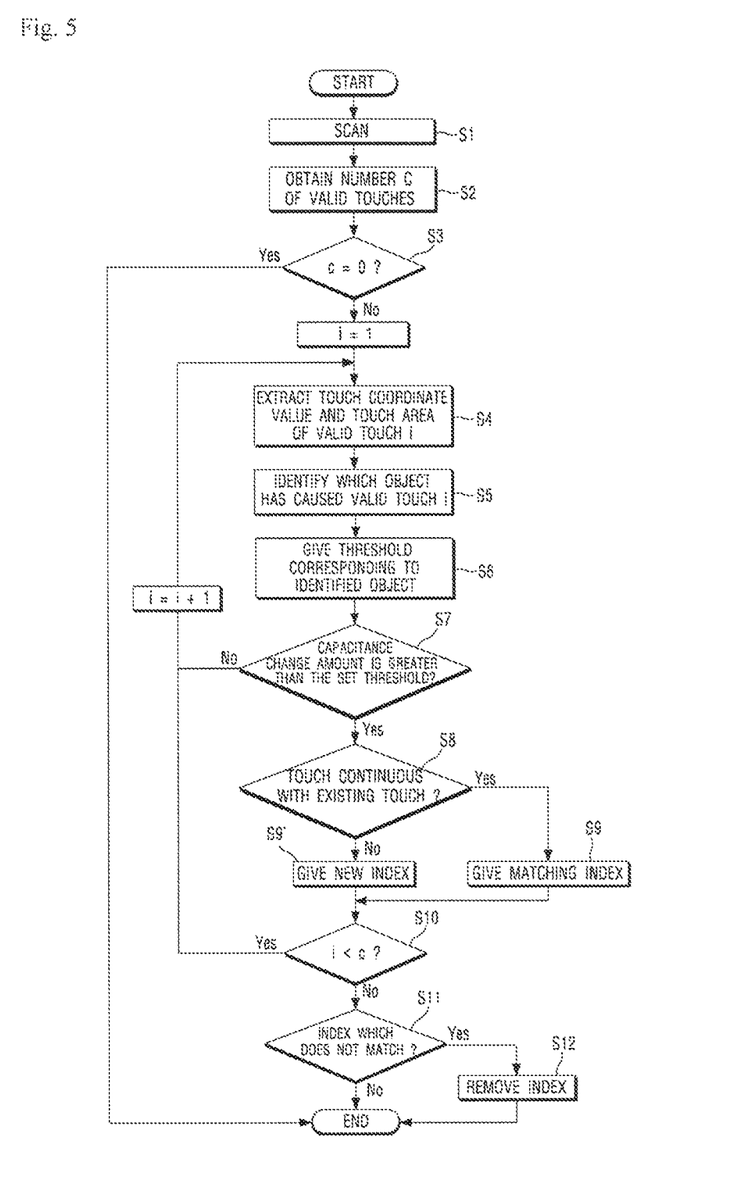
FIG. 5 is a flowchart showing a second embodiment of a method for controlling the touch screen of the touch screen controller according to the embodiment of the present invention.

FIG. 5 is a flowchart showing a second embodiment of a method for controlling the touch screen of the touch screen controller according to the embodiment of the present invention.

Referring to FIG. 5, the touch screen controller 100 scam whether the touch signal is input to the touch screen 20 or not (S1), and then determines the scanned input signal is a valid touch signal or not. In order to clearly distinguish the valid touch signal, the touch screen controller 100 may make use of an initial threshold. The initial threshold may be dynamically determined based on a predetermined value or, for example, surroundings, background noise, and a capacitance change amount difference of each touch object. When the touch signal exceeds the threshold value, it may be determined whether the signal is derived from the hovering or touching.

The touch signal sensing unit 230a or the driver IC 225 collects the capacitance change amount of the each sensing cell "A" corresponding to the valid touch and outputs the capacitance change amount of the each sensing cell "A" to the control units 210a and 210b in every scanning cycle in which the reception of detection of the capacitance changes of all the sensing cells "A" is completed. In other words, when multi-touches occur, the capacitance change amount of the each sensing cell "A" caused by a plurality of the objects is outputted every scanning cycle. Also, the touch signal sensing unit may output the capacitance change amount of the each sensing cell "A" corresponding to the valid touch to the control units 210a and 210b, and the control units 210a and 210b may collect the capacitance change amount of the each sensing cell "A" in every scanning cycle.

The number "c" of the valid touches collected in every scanning cycle is obtained (S2). It is determined whether the valid touch is present or not (S3). If the valid touch is present, the touch coordinate value and touch area of the valid touch are extracted (S4). If the valid touch is not present, it is determined that no touch has occurred, and processing ends. Here, "i" of FIG. 5 represents the dummy number of routing of S4 to S10.

Among the capacitance change amounts of the sensing cells "A", which have been input from the touch signal sensing unit 230a or the driver IC 225, the touch coordinate value of the invalid touch is calculated on the basis of a minimal point with a capacitance change amount equal to or less than the capacitance change amounts of four neighboring sensing cells "A" and on the basis of a maximal point with a capacitance change amount equal to or greater than the capacitance change amounts of four neighboring sensing cells "A".

The touch area of the valid touch can be defined to include the sensing cells "A" within a predetermined distance in up, down, right and left directions with respect to the sensing cell "A" corresponding to the touch coordinate value of the valid touch. Also, the touch signal sensing unit 230a or the driver IC 225 performs at least one of S2 to S4, thereby outputting at least one of the number "c" of the valid touches, and the coordinate value and touch area of the valid touch to the control units 210a and 210b.

Then, it is determined that the touch input conditions of which object are satisfied by the valid touch, so that it is identified which object has caused the valid touch (S5). The pattern of the capacitance change of the sensing cell "A" of the touch screen 20 may be used to identify the object. First, when the object touched on the touch screen 20 is a stylus pen, the thickness of the stylus pen is so small that an area composed of sensing cells "A" with the capacitance changed in a predetermined touch area within the touch screen 20 may be very small. The area composed of sensing cells "A" with the capacitance change amount may have a shape close to a circle. Meanwhile, when the object touched on the touch screen 20 is finger, the finger is thicker than the stylus pen, so that the capacitance change amount occurs in the larger number of the sensing cells "A" than in the number of the sensing cells "A" of the stylus pen. Accordingly, an area composed of sensing cells "A" with the capacitance changed in a predetermined touch area may be greater than that of the stylus pen. Also, the area composed of sensing cells "A" with the capacitance change amount may have a shape close to an ellipse. Here, the touch area may be determined to include the sensing cells within a certain distance from the sensing cell in which the greatest capacitance change amount is caused by the touch.

Therefore, through use of the capacitance change pattern according to the touched object, the object which has touched the touch screen 20 can be identified. Also, in S5, it is possible to determine the touch input conditions of which object are satisfied by the valid touch through the use of at least one of a sum of the capacitance change amounts of at least two sensing cells "A" included in the touch area, the number of the sensing cells "A" with the capacitance change amount greater than a predetermined capacitance change amount in the touch area, the number of the sensing cells "A" of which the capacitance change amount is greater own a predetermined rate of the maximum capacitance change amount or minimum capacitance change amount in the touch area, and a ratio of a sum of a predetermined number of the upper capacitance change amounts within the touch screen 20 to a sum of the predetermined number of the lower capacitance change amounts within the touch screen 20.

Figure 6A:
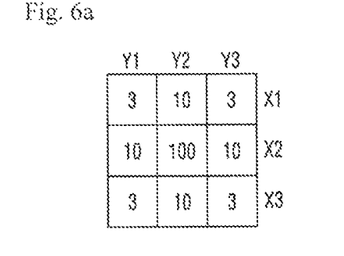
FIGS. 6*a* and 6*b* are views showing the capacitance change amount at the time of touching the touch screen of the embodiment of the present invention with the stylus pen.
Figure 6B:
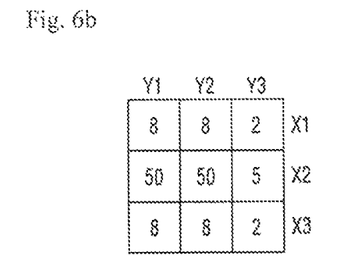
Figure 7A:
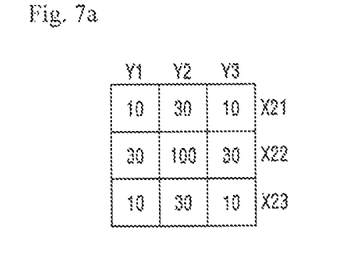
FIGS. 7*a* and 7*b* are views showing the capacitance change amount at the time of touching the touch screen of the embodiment of the present invention with a finger.
Figure 7B:
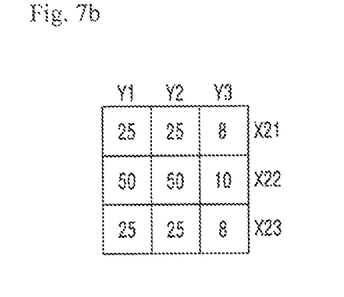

FIGS. 6a and 6b are views showing the capacitance change amount of the each sensing cell "A" within the touch area at the time of touching the touch screen of the embodiment of the present invention with the stylus pen. FIGS. 7a and 7b are views showing the capacitance change amount of the each sensing cell "A" within the touch area at the time of touching the touch screen of the embodiment of the present invention with the finger. Here, FIGS. 6a and 7a show one sensing cell with the maximum capacitance change amount within the touch area respectively. FIGS. 6b and 7b show two or more sensing cell with the maximum capacitance change amount within the touch area respectively.

The following table 1 is used for describing the process of S5 of FIG. 5.

TABLE 1

|  | FIG. 6a | FIG. 6b | reference value | FIG. 7a | FIG. 7b |
|---|---|---|---|---|---|
| a sum of capacitance change amount | 152 | 141 | 180 | 260 | 226 |
| the number of sensing cells of which the capacitance change amount is greater than 20 | 1 | 2 | 3 | 5 | 6 |
| the number of the sensing cells of which the capacitance change amount is equal to or greater than 25% or the maximum capacitance change amount | 1 (>25) | 2 (>12.5) | 3 | 5 (>25) | 6 (>12.5) |
| a sum of four upper capacitance change amounts/ a sum of four lower capacitance change amounts | 10.8 (130/ 12) | 6.8 (116/ 17) | 6 | 4.75 (190/ 40) | 2.9 (150/ 51) |

Referring to FIGS. 6a, 6b, 7a and 7b and the table 1, according to the process method of S5, first, the sums of the capacitance change amounts of respective sensing cells "A" within the touch area are compared with a reference value. That is, when the sum or the capacitance change amount of the sensing cell "A" within the touch area is less than the reference value of 180, the process of S5 determines that the touch signal is input by the stylus pen. On the contrary to this, when the sum of the capacitance change amount of the sensing cell "A" within the touch area is greater than the reference value, the process of S5 determines that the touch signal is input by the finger. Where as shown in FIG. 6a, the sum of the capacitance change amount is 152 (=100+10+10+10+10+3+3+3+3), or when, as shown in FIG. 6b, the sum of the capacitance change amount is 141, the process of S5 determines that the stylus pen has touched. Further, when, as shown in FIG. 7a, the sum of the capacitance change amount is 260, or when, as shown in FIG. 7b, the sum of the capacitance change amount is 226, the process of S5 determines that the finger has touched.

Also, according to the process method of S3, the number of the sensing cells "A" with the capacitance change amount greater than a predetermined capacitance change amount within the touch area is compared with a reference value. In other words, when a predetermined capacitance change amount is set to be 20, and when the number of the sensing cells "A" with the capacitance change amount greater than 20 within the touch area is less than 3, the process of S5 determines that the touch signal is input by the stylus pen. On the contrary to this, when the number of the sensing cells "A" with the capacitance change amount greater than 20 within the touch area is greater than 4, the process of S5 determines that the touch signal is input by the finger. When, as shown in FIG. 6a, the number of the sensing cells "A" with the capacitance change amount greater than 20 is 1 (100), or when, as shown in FIG. 6b, the number of the sensing cells "A" with the capacitance change amount greater than 20 is 2 (50, 50), the process of S5 determines that the touch signal is input by the stylus pen. Further, when, as shown in FIG. 7a, the number of the sensing cells "A" with the capacitance change amount greater than 20 is 5 (100,30,30,30,30), or when, as shown in FIG. 7b, the number of the sensing cells "A" with the capacitance change amount greater than 20 is 6 (50,25,25,25,25,25), the process of S5 determines that the touch signal is input by the finger.

Also, according to the process method of S5, the number of the sensing cells "A" of which the capacitance change amount is greater than a predetermined rate of the maximum capacitance change amount or minimum capacitance change amount within the touch area is compared with a reference value. In other words, when the predetermined rate is set to be 25%, and when the number of the sensing cells "A" of which the capacitance change amount is greater than 25% of the maximum capacitance change amount within the touch area is less than 3, the process of S5 determines that the touch signal is input by the stylus pen. On the contrary to this, when the number of the sensing cells "A" of which the capacitance change amount is greater than 25% of the maximum capacitance change amount within the touch area is greater than 4, the process of S5 determines that the touch signal is input by the finger. When, as shown in FIG. 6a, the number of the sensing cells "A" of which the capacitance change amount is greater than 25% of the maximum capacitance change amount is 1 (100), or when, as shown in FIG. 6b, the number of the sensing cells "A" of which the capacitance change amount is greater than 25% of the maximum capacitance change amount is 2 (50, 50), the process of S5 determines that the touch signal is input by the stylus pen. Further, when, as shown in FIG. 7a, the number of the sensing cells "A" of which the capacitance change amount is greater than 25% of the maximum capacitance change amount is 5 (100,30,30,30,30), or when, as shown in FIG. 7b, the number of the sensing cells "A" of which the capacitance change amount is greater than 25% of the maximum capacitance change amount is 6 (50,25,25,25,25, 25), the process of S5 determines that the touch signal is input by the finger.

Also, according to the process method of S5, a ratio of a sum of a predetermined number of the upper capacitance change amounts to a sum of the predetermined number of the lower capacitance change amounts within the touch area is compared with a reference value. In other words, when the predetermined number is set to be 4, and when the ratio of the sum of four upper capacitance change amounts within the touch area to the sum of four lower capacitance change amounts within the touch area is greater than the reference value of 6, the process of S5 determines that the touch signal is input by the stylus pen. On the contrary to this, when the ratio of the sum of four upper capacitance change amounts within the touch area to the sums of four lower capacitance change amounts within the touch area is less than the reference value of 6, the process of S5 determines that the touch signal is input by the finger. As shown in FIG. 6a, the ratio of the sum of four upper capacitance change amounts to the sum of four lower capacitance change amounts is 10.8 (=130÷12), and as shown in FIG. 6b, the ratio of the sum of four upper capacitance change amounts to the sum of four lower capacitance change amounts is 6.8 (=116÷17). Accordingly, the process of S5 determines that the touch signal is input by the stylus pen. As shown in FIG. 7a, the ratio of the sum of four upper capacitance change amounts to the sum of four lower capacitance change amounts is 4.75 (=190÷40), and as shown in FIG. 7b, the ratio of the sum of four upper capacitance chance amounts to the sum of four lower capacitance change amounts is 2.9 (=150÷51). Accordingly, the process of S5 determines that the touch signal is input by the finger.

Here, although the methods for identifying the finger and the stylus pen have been independently described, the at least two proposed methods may be repetitively used. Also, the number of the sensing cells "A" with the predetermined capacitance change amount is just an example of an identification criterion of the finger and the stylus pen, and the identification criterion is not limited to this.

Continuously, the touch screen controller 100 sets a threshold in correspondence with the object determined in S5 (S6). Here, the threshold is the first threshold if the determined object is the first object, and the threshold is the second threshold if the determined object is the second object. The first threshold and the second threshold cannot be defined as a particular value because the magnitude of the change amount of each of the sensing cells "A" of the touch screen 20 depends on the size, thickness, material, etc., of the object touching the touch screen 20. The first threshold and the second threshold may be optionally set by a designer.

Therefore, it is important for the touch screen 20 to identify which object has generates the touch signal. Here, in S6, the threshold is set in order to clearly distinguish a source that has touched the touch screen.

Continuously, after the threshold is given in S6, the touch operation is performed if the capacitance change amount of the touch signal is greater than the threshold. Further, if the capacitance change amount of the touch signal is less than and not equal to the threshold, it is not determined that the touch has normally occurred, and then the scanning is performed again (S7). Here, the threshold for processing the touch operation is determined as the first threshold or the second threshold in correspondence with the object identified in S6.

Continuously, after the touch operation is performed in S7, it is determined whether or not the touch satisfies the index matching conditions of the existing indices, and then, it is identified whether or not the touch is continuous with the touch detected in the previous scanning cycle (S8).

The index matching condition may be formed based on a distance, etc., between the touch coordinate value and the touch signal coordinate value that have been detected in the previous scanning cycle under the state where the same threshold is given.

Continuously, when the index matching condition is satisfied in S8, the matching index is given to the touch signal (S9). Also, when index matching conditions are not satisfied, it is determined that a new touch has been input, and thus a new index is given (S9').

It is important for the touch screen to identify whether the touch signal is continuous with the existing touch or is a new touch. Here, in S9 and S9', the index is given in order to clearly distinguish the continuity of the touch of the touch screen.

The foregoing steps of setting the threshold and giving the index in S4 to S9 or S4 to S9' are performed for the valid touch of which the capacitance change amount is greater than the set threshold determined in S7.

After the index are given to all valid touches, it is determined whether or not an existing index in a previous scanning cycle is present which does not satisfy the index matching condition with respect to any valid touch (S11).

When an existing index in a previous scanning cycle is present which does not satisfy the index matching condition with respect to any valid touch, the index of the corresponding touch signal is removed (S12). That is, when there exists a touch that is not continuous with all valid touches among the existing touches, the existing touch is determined as the final touch, and the index of the corresponding touch signal is removed, so that it is possible to remove errors in determining the continuity of the valid touch in the following scanning cycles.

The above-mentioned embodiment includes a step S12 of removing the index of the previous scanning cycle of the each scanning cycle, and may be changed into a method for removing an index in a previous predetermined scanning cycle such as previous two scanning cycles of the scanning step S1, etc. Through this, a time factor can be adjusted in determining the continuity of the touch.

Here, all of the procedures for one scanning cycle may be ended by the above ending. That is, S1 to S12 may be repeated every scanning cycle.

Figure 8:
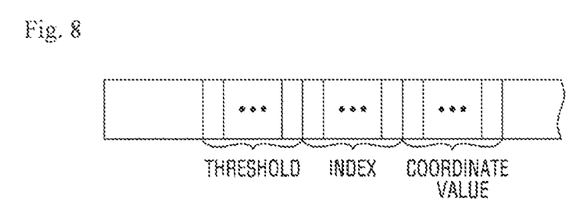
FIG. 8 is a schematic view showing a data format of a touch signal of FIG. 6.

Meanwhile, FIG. 8 is a schematic view showing a data format of the touch signal of FIG. 6. Referring to FIG. 8, the data format of the touch signal according to the touch processing mode of the present invention may be composed of a threshold field in which the first threshold or the second threshold is recorded, an index field used for identifying whether the touches are the same or different in correspondence with a given code value, and a coordinate value field including information on input position of the touch signal, and the like.

Figure 9:
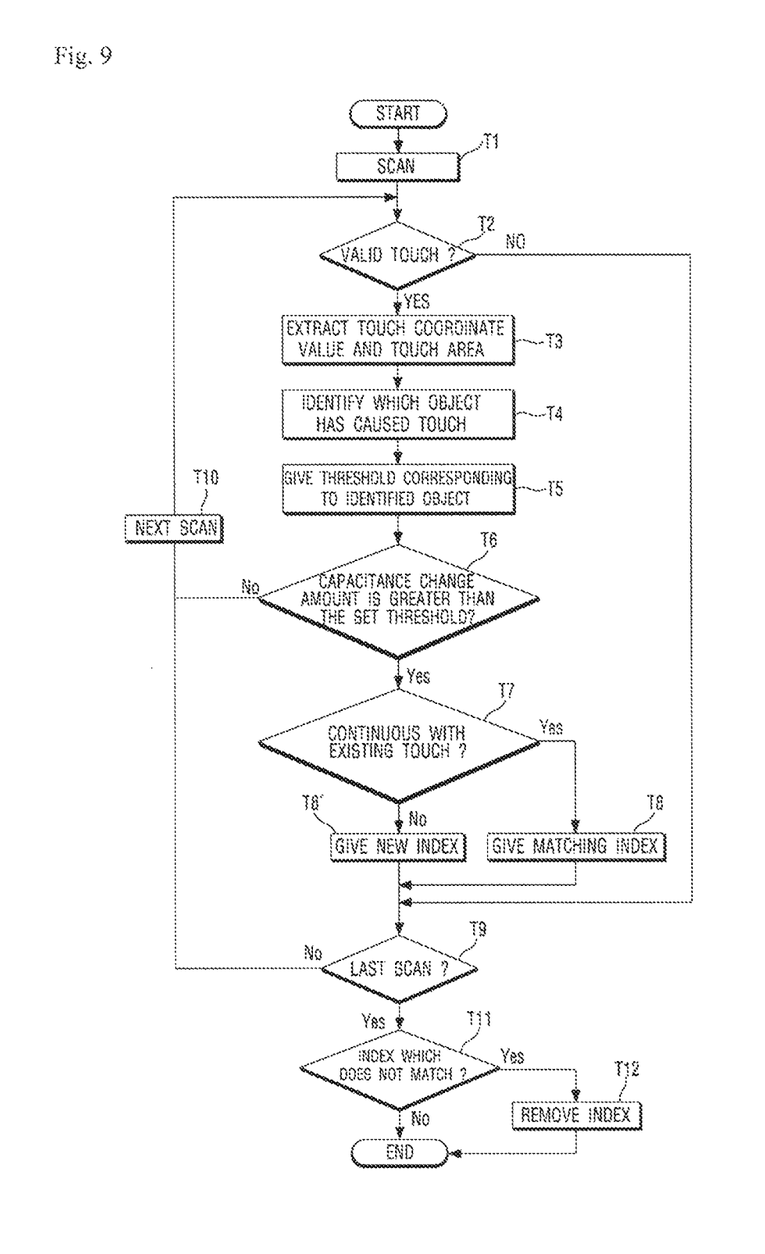
FIG. 9 is a flowchart showing a third embodiment of the method for controlling the touch screen of the touch screen controller according to the embodiment of the present invention.

FIG. 9 is a flowchart showing a third embodiment of the method for controlling the touch screen of the touch screen controller according to the embodiment of the present invention.

As shown in FIGS. 1 and 9, scanning is performed whether the touch signal is input to the touch screen 20 or not (T1).

Then, it is determined whether or not the scanned input signal is a valid touch signal (T2). When the input signal is a valid touch signal, the touch coordinate value and touch area of the valid touch depending on the capacitance change amount of the each sensing cell "A" corresponding to the valid touch are extracted (T3). Here, among the capacitance change amounts of the sensing cells "A", which have been input from a touch signal sensing units 290, the touch coordinate value of the invalid touch can be calculated on the basis of a minimal point with a capacitance change amount equal to or less than the capacitance change amounts of four neighboring sensing cells "A" and on the basis of a maximal point with a capacitance change amount equal to or greater than the capacitance change amounts of four neighboring sensing cells "A". The touch area of the valid touch can be defined to include the sensing cells "A" within a predetermined distance in up, down, right and left directions with respect to the sensing cell "A" corresponding to the touch coordinate value of the valid touch.

Continuously, since the following T4 to T8 or T4 to T8' are the same as S5 to S9 or S5 to S9' of the foregoing first touch screen control method, a detailed description thereof will be omitted.

After the index is given through the T8 or T8', the touch screen controller 100 determines whether the scan is the last scan or not (T9). Meanwhile, in determining whether or not the scanned input signal is a valid touch signal (T2), even when the scanned input signal is not a valid touch signal, the touch screen controller 100 determines whether the scan is the last scan or not.

In the determination of T9, when the scan is not the last scan, the next scanning is performed (T10). Meanwhile, when scan is the last scan, T11 to T12 are continuously performed. Since T11 to T12 are the same as S11 to S12 of the foregoing first touch screen control method, a detailed description thereof will be omitted.

Figure 10A:
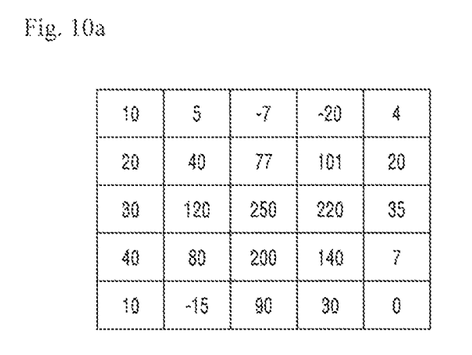
FIGS. 10a and 10b are views showing the capacitance change amount generated at the time of scanning and touching the touch screen of the touch screen controller according to the embodiment of the present invention.
Figure 10B:
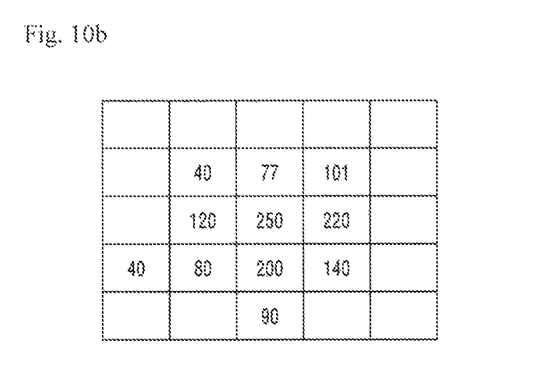

FIGS. 10a and 10b are views showing the capacitance change amount generated at the time of scanning and touching the touch screen of the touch screen controller according to the embodiment of the present invention.

Referring to FIGS. 2, 10a, and 10b, the touch screen controller 100 scans the touch screen. When the capacitance change amount greater than a reference value of the sensing cell "A" is detected, the touch screen controller 100 recognizes that the touch has occurred. In more detail, the control unit 210a receives the capacitance change amount received from each of the sensing cells "A" by the sensing signal transmitted from the touch signal sensing unit 230a to the sensing lines Y1, Y2, Y3, . . . , Ym−1, and Ym. Here, the control unit 210a determines the capacitance change amount having the maximum value in accordance with a predetermined area of the touch screen. In FIG. 10a, it is assumed that the size of the predetermined area is 5×5. Then, the threshold is compared with the determined capacitance change amount having the maximum value. If the capacitance change amount is greater than the threshold, the control unit 210a recognizes that the touch has occurred, and if not, the control unit 210a does not recognize that the touch has occurred. As such, in the case where the capacitance change amount is determined according to the sensing cell, when the touch area is large, for example, a case of touching by palm or thick fingers, the capacitance change amount having two or more maximum values may occur according to the predetermined area. In this case, it is not possible to accurately determine the touch location. Therefore, the control unit classifies the threshold into a group threshold and a comparison threshold, and is able to recognize the capacitance change amount of the sensing cell, which is greater than the group threshold in the predetermined area, as a valid change amount. In FIG. 10b, the group threshold is set to be 40, and the capacitance change amounts of the valid sensing cells are summed. The summed value may be designated as a group value. The group value is compared with the comparison threshold. If the group value is greater than the comparison threshold, the control unit 210a may recognize that the touch has occurred, and if the group value is less than and not equal to the comparison threshold, the control unit 210a may not recognize that the touch has occurred. Here, although it is described that the threshold is classified into the group threshold and the comparison threshold with respect to the touch, the group threshold and the comparison threshold may be set differently from each other in correspondence with the touched object.

Figure 11:
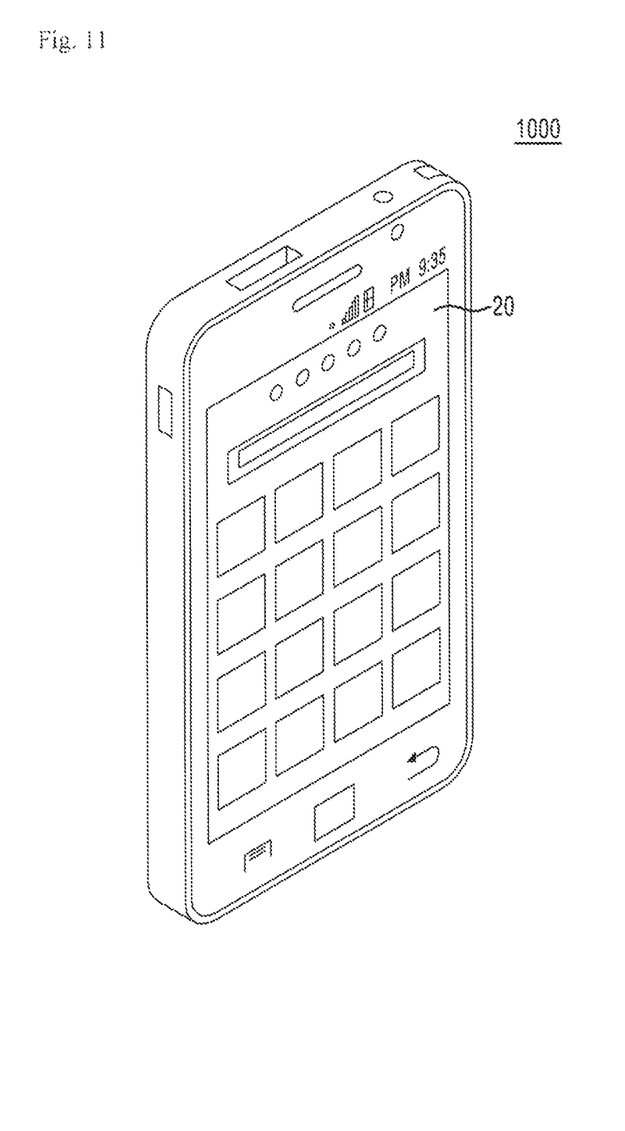
FIG. 11 is a perspective view showing an electronic device equipped with the touch screen controller according to the embodiment of the present invention.

FIG. 11 is a perspective view showing an electronic device equipped with the touch screen controller according to the embodiment of the present invention.

As shown in FIG. 11, the touch screen controller according to the embodiment of the present invention may be applied to an electronic device 1000 such as a cellular phone including the touch screen 20. Since the touch screen controller according to the embodiment processes at least two touch operation modes independently and respectively in accordance with the object touched on the touch screen 20, thereby being advantageous for improving the efficiency of the electronic device 1000 that implements various functions at the same time.

Here, the electronic device 1000 is not limited to the cellular phone shown in FIG. 11. For example, the electronic device 1000 may include a variety of electronic devices, e.g., a mobile electronic device, a laptop computer, a portable computer, a portable multimedia player (PMP), a camcorder, a web tablet, a car navigation system, a personal digital assistant (PDA), and the like.

The features, structures and effects and the like described in the embodiments are included in at least one embodiment of the present invention and are not necessarily limited to one embodiment. Furthermore, the features, structures, effects and the life provided in each embodiment can be combined or modified in other embodiments by those skilled in the art to which the embodiments belong. Therefore, contents related to the combination and modification should be construed to be included in the scope of the present invention.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch screen controller comprising:
   a driving part which transmits a driving signal to a touch screen including a plurality of sensing cells;
   a touch signal sensing unit which transmits a sensing signal to the touch screen and transmits information on a capacitance change pattern of a predetermined area including at least two sensing cells among the plurality of the sensing cells by the driving signal and the sensing signal in correspondence with an object which has touched the touch screen; and a control unit which determines a kind of the object which touches the touch screen, by receiving the information on the capacitance change pattern from the touch signal sensing unit, sets a threshold in correspondence with the determined kind of the object, and determines that a touch signal is generated when a capacitance change amount greater than the set threshold is detected in one sensing cell or a group of sensing cells among the plurality of the sensing cells included in the touch screen,
   wherein the information on the capacitance change pattern comprises a ratio of a sum of a predetermined number of upper capacitance change amounts within a touch area to a sum of a predetermined number of lower capacitance change amounts within the touch area.

2. The touch screen controller of claim 1, wherein the threshold is classified into a group threshold and a comparison threshold, wherein the sensing cells of which the capacitance change amounts greater than the group threshold are detected among the plurality of the sensing cells are set as the group by the control unit, wherein the control unit calculates a sum of the capacitance change amounts of the sensing cells set as the group, and compares the sum with the comparison threshold, and wherein, when the sum of the capacitance change amounts is greater than the comparison threshold, the control unit determines that the touch has been input.

3. The touch screen controller of claim 2, wherein the comparison threshold is classified into a first threshold corresponding to a finger, or a second threshold corresponding to a stylus pen.

4. The touch screen controller of claim 3, wherein the control unit assigns an index in correspondence with the touch signal, and detects and distinguishes multiple simultaneous touches on the touch screen in accordance with the index.

5. The touch screen controller of claim 2, wherein the control unit assigns an index in correspondence with the touch signal, and detects and distinguishes multiple simultaneous touches on the touch screen in accordance with the index.

6. The touch screen controller of claim 1, wherein the control unit is connected to a memory unit storing information on the threshold according to the kind of the object, and receives the information on the threshold from the memory unit.

7. The touch screen controller of claim 6, wherein the control unit assigns an index in correspondence with the touch signal, and detects and distinguishes multiple simultaneous touches on the touch screen in accordance with the index.

8. The touch screen controller of claim 1, wherein the control unit assigns an index in correspondence with the touch signal, and detects and distinguishes multiple simultaneous touches on the touch screen in accordance with the index.

9. A touch screen controller comprising:
a driving part which transmits a driving signal to a touch screen including a plurality of sensing cells;
a touch signal sensing unit which transmits a sensing signal to the touch screen and transmits information on a capacitance change pattern of the sensing cells in a predetermined area among the plurality of the sensing cells by the driving signal and the sensing signal in correspondence with an object which has touched the touch screen; and
a control unit performing a touch processing mode including at least a first touch processing mode and a second touch processing mode which is performed in correspondence with mutually different thresholds,
wherein, when the first touch processing mode is performed, the control unit prevents the second touch processing mode from being performed,
wherein the information on the capacitance change pattern comprises a ratio of a sum of a predetermined number of upper capacitance change amounts within the touch area to a sum of a predetermined number of lower capacitance change amounts within the touch area.

10. The touch screen controller of claim 9, wherein the control unit is connected to a memory unit storing a threshold of the capacitance change amount corresponding to the object, and sets the threshold stored in the memory unit in correspondence with the capacitance change pattern.

11. The touch screen controller of claim 10, wherein the control unit assigns an index in correspondence with the touch signal, and detects and distinguishes multiple simultaneous touches on the touch screen in accordance with the index.

12. The touch screen controller of claim 9, wherein the threshold is classified into a group threshold and a comparison threshold, wherein the control unit receives the sensing signal, wherein the sensing cells of which capacitance change amounts greater than the group threshold are detected among the plurality of the sensing cells are set as a group by the control unit, wherein the control unit calculates a sum of the capacitance change amounts of the sensing cells set as the group, and compares the sum with the comparison threshold, wherein, when the sum of the capacitance change amounts is greater than the comparison threshold, the control unit determines that a touch has been input, and wherein the control unit generates the information on the capacitance change pattern by using information on the capacitance change amounts of the sensing cells determined to which the touch has been input.

13. The touch screen controller of claim 12, wherein the comparison threshold corresponds to a finger or a stylus pen.

14. The touch screen controller of claim 13, wherein the control unit assigns an index in correspondence with the touch signal, and detects and distinguishes multiple simultaneous touches on the touch screen in accordance with the index.

15. The touch screen controller of claim 12, wherein the control unit assigns an index in correspondence with the touch signal, and detects and distinguishes multiple simultaneous touches on the touch screen in accordance with the index.

16. The touch screen controller of claim 9, wherein the control unit assigns an index in correspondence with the touch signal, and detects and distinguishes multiple simultaneous touches on the touch screen in accordance with the index.

17. A method for controlling a touch screen which detects a touch in correspondence with a capacitance change amount of a plurality of sensing cells, the method comprising:
identifying a kind of an object by means of information on a capacitance change pattern of a predetermined area including at least two sensing cells among the plurality of the sensing cells by the object touching the touch screen; and
setting a threshold corresponding to the kind of the object and performing a touch processing mode by determining that the touch has been input when a capacitance change amount greater than the threshold is detected,
wherein the information on the capacitance change pattern comprises a ratio of a sum of a predetermined number of upper capacitance change amounts within the touch area to a sum of a predetermined number of lower capacitance change amounts within the touch area.

18. The method of claim 17, wherein the performing the touch processing mode further comprises:
assigning the same index to the touch signals determined to be generated by the same object; and
detecting and distinguishing multiple simultaneous touches on the touch screen in accordance with the index.

19. The method of claim 17, wherein the performing the touch processing mode further comprises:
assigning the same index to the touch signals determined to be generated by the same object; and
detecting and distinguishing multiple simultaneous touches on the touch screen in accordance with the index.

20. The method of claim 17, wherein the threshold is classified into a group threshold and a comparison threshold, further comprising scanning prior to identifying the object, wherein, in the scanning, the sensing cells of which capacitance change amounts greater than the set group threshold are detected among the plurality of the sensing cells are set as a group, and wherein whether the touch is input or not is determined by calculating a sum of the capacitance change amounts of the sensing cells set as the group and by comparing the sum with the comparison threshold.

21. A method for controlling a touch screen which detects a touch in correspondence with a capacitance change amount of a plurality of sensing cells, the method comprising:

identifying a kind of an object by means of information on a capacitance change pattern of a predetermined area including at least two sensing cells among the plurality of the sensing cells formed by the object touching the touch screen; and performing a touch processing mode including at least a first touch processing mode and a second touch processing mode in accordance with the mode in correspondence with the kind of the object, wherein the performing in accordance with the mode comprises preventing the second touch processing mode from being performed when the first touch processing mode is performed in correspondence with the touching object, wherein the information on the capacitance change pattern comprises a ratio of a sum of a predetermined number of upper capacitance change amounts within the touch area to a sum of a predetermined number of lower capacitance change amounts within the touch area.

22. The method of claim 21, wherein the identifying the kind of the object further comprises determining the kind of the object by using the information on the capacitance change pattern.

23. The method of claim 21, wherein the performing in accordance with the mode further comprises respectively assigning the same index to touch signals determined to be generated by the same object; and detecting and distinguishing multiple simultaneous touches on the touch screen in accordance with the index.

24. The method of claim 21, wherein the threshold is classified into a group threshold and a comparison threshold, further comprising scanning prior to identifying the object, wherein, in the scanning step, the sensing cells of which capacitance change amounts greater than the set group threshold are detected among the plurality of the sensing cells are set as a group, and wherein whether the touch is input or not is determined by calculating a sum of the capacitance change amounts of the sensing cells set as the group and by comparing the sum with the comparison threshold.

* * * * *